United States Patent
Shah et al.

(10) Patent No.: US 11,436,185 B2
(45) Date of Patent: Sep. 6, 2022

(54) SYSTEM AND METHOD FOR TRANSACTION BROADCAST IN A NETWORK ON CHIP

(71) Applicant: ARTERIS, INC., Campbell, CA (US)

(72) Inventors: Syed Ijlal Ali Shah, San Jose, CA (US); John Coddington, Cedar Park, TX (US); Benoit de Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 16/685,794

(22) Filed: Nov. 15, 2019

(65) Prior Publication Data

US 2021/0149836 A1 May 20, 2021

(51) Int. Cl.
*G06F 15/78* (2006.01)
*G06F 13/20* (2006.01)
*G06F 13/40* (2006.01)

(52) U.S. Cl.
CPC .......... *G06F 15/7825* (2013.01); *G06F 13/20* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 7,286,538 B2* | 10/2007 | Song | H04L 12/18 370/392 |
| 8,121,123 B2* | 2/2012 | Koren | H04L 12/1836 370/390 |
| 9,542,152 B2* | 1/2017 | Lee | G06F 5/12 |
| 10,833,980 B2* | 11/2020 | Jaffer | H04L 45/24 |
| 2008/0294797 A1 | 11/2008 | Nolterieke et al. | |
| 2015/0103822 A1* | 4/2015 | Gianchandani | H04L 69/08 370/389 |
| 2019/0379573 A1* | 12/2019 | Pontes | H04L 12/46 |

* cited by examiner

*Primary Examiner* — Ernest Unelus
*Assistant Examiner* — Dayton Lewis-Taylor
(74) *Attorney, Agent, or Firm* — Dana Legal Services; Jubin Dana

(57) ABSTRACT

Systems and methods are disclosed for broadcasting transactions, inside a network-on-chip (NoC), from a master to multiple slaves and for receiving responses. The transactions originate from a master and are send, using the NoC, to broadcast adapters using a special range of addresses. The broadcast adapters receive the transactions from the master. The broadcast adapters duplicate the transactions and send the duplicated transaction to multiple slaves. The slaves send a response, which is transported back by the NoC to the corresponding master.

13 Claims, 8 Drawing Sheets

SYSTEM AND METHOD FOR TRANSACTION BROADCAST IN A NETWORK ON CHIP

FIELD OF THE INVENTION

The present technology is in the field of system design and, more specifically, related to broadcasting transactions in a network-on-chip (NoC).

BACKGROUND

System design of computer processors include multiprocessor systems. These multiprocessor systems have been implemented in systems-on-chips (SoCs) that communicate through network-on-chips (NoCs). The SoCs include instances of master (initiators) intellectual properties (IPs) and slave (targets) IPs. In some instances, one master sends a transaction or request to multiple slaves. The transactions are send using industry-standard protocols, such as ARM AMBA AXI, AHB or APB; or OCP-IP. The protocols have a strict request/response semantic, and typically are treated by a NoC as unicast: the master, connected to the NoC, sends a request to a slave, using an address to select the slave. The NoC decodes the address and transports the request from the master to the slave. The slave handles the transaction and sends a response, which is transported back by the NoC to the master.

The current known approach, when a master needs to send the same transaction or request to multiple slaves, is for the master to send all the requests sequentially. The master sends the transaction to the first slave, then to the second slave, then to the third slave and so on. For example, if a master wants to write the same data into 16 different slaves, the master sends 16 identical write transactions, in sequence, with one going to each slave. Thus, the time taken by the total operation—for sending 16 transactions—is 16 times the time of a single write transaction. This limits the rate at which an identical request can be sent to multiple slaves. The rate is limited by the rate at which the master can send sequential request to all the destinations, ie the slaves. Therefore, what is needed is a system and method that reduces the time taken to send multiple identical transactions from a master to multiple slaves.

SUMMARY OF THE INVENTION

In accordance with various embodiments and aspects of the invention, systems and methods are provided to implement a new approach to sending a transaction from one master to multiple slaves. According to the various embodiments and aspects of the invention, a special range of addresses is used. The network-on-chip (NoC) broadcasts a transaction received at a special address, which is within the special range of addresses, to multiple destinations or slaves simultaneously instead of sending it to a single destination. One advantage is maximum efficiency of the operation that includes sending the same transaction to multiple destinations. Another advantage includes the ability to perform functions on a transaction prior to broadcasting the transaction.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

As used herein, a "master" and a "initiator" refer to similar intellectual property (IP) modules or units and the terms are used interchangeably within the scope and embodiments of the invention. As used herein, a "slave" and a "target" refer to similar IP modules or units and the terms are used interchangeably within the scope and embodiments of the invention. As used herein, a transaction may be a request transaction or a response transaction. Examples of request transactions include write request and read request.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
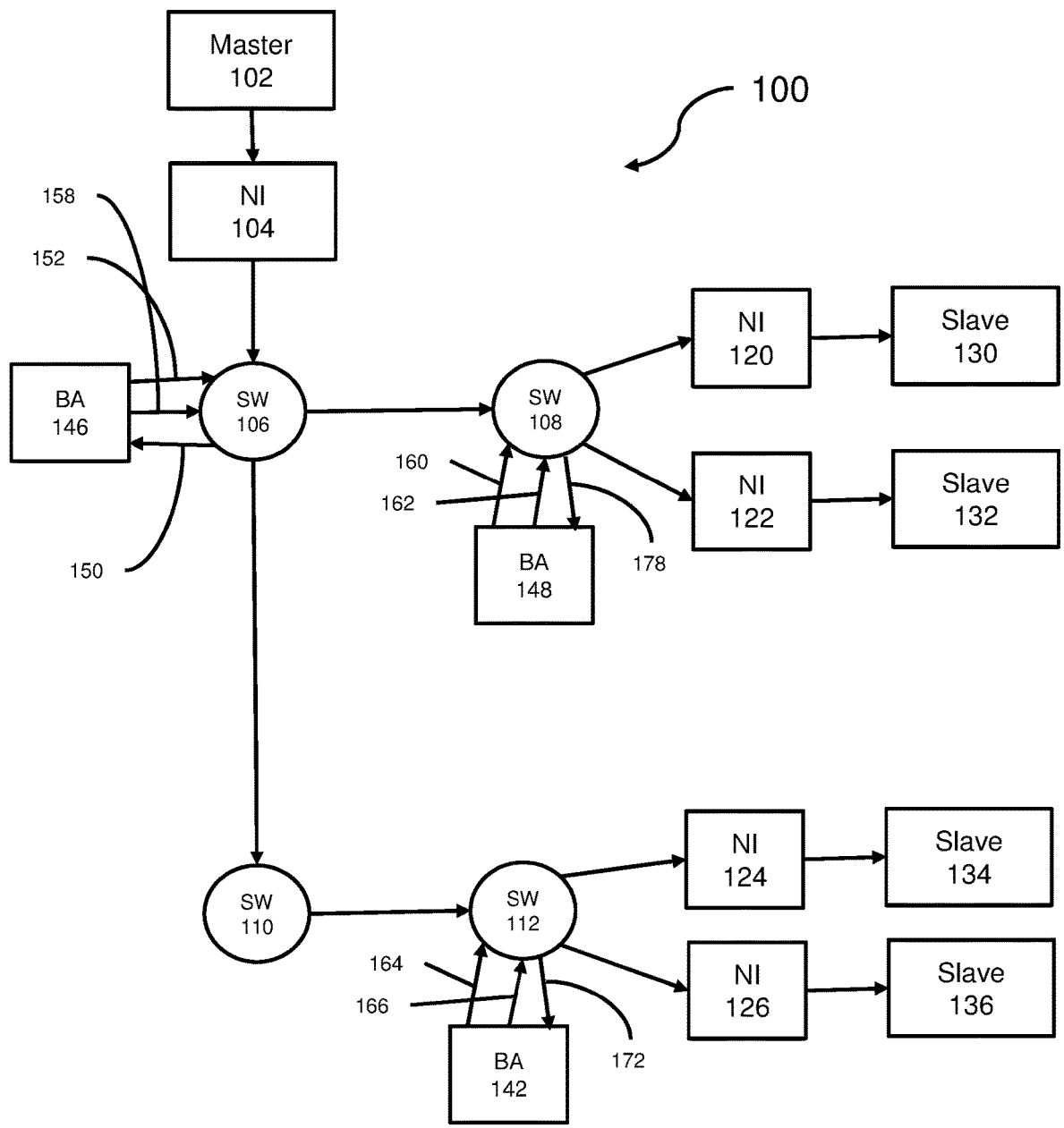
FIG. 1 shows a network-on-chip (NoC) with a master and multiple slaves according to an embodiment of the invention.

Referring now to FIG. 1, a network-on-chip (NoC) 100 is shown in accordance with an embodiment of the invention. The NoC includes a master 102 in communication with a network interface unit (NI) 104. The network interface units connected to slaves are used to convert the protocol used inside the NoC to the protocols used by the slaves. The NI 104 translates the incoming transactions, form the master 102, to the protocol used inside the NoC 100 for transport. The NI 104 is in communication with a switch 106. The switch 106 is in communication with a switch 108 and a switch 110. The switch 110 is in communication with the switch 112. The NoC 100 includes various pipeline elements in accordance with various embodiments of the invention, some of which are shown and some of which are not shown. The master 102 can communicate, through the NoC 100, with slaves 130, 132, 134, and 136. The slave 130 communicates through a NI 120. The slave 132 communicates through a NI 122. The slave 134 communicates through a NI 124. The slave 136 communicates through a NI 126. In accordance with this embodiment of the invention, the master 102, through the NI 104 inside the NoC 100, communicates with four slaves 130-136 using four NIs 120-126, respectively. It will be apparent that many other embodiments are contemplated with multiple masters and multiple slaves, even though only one master and four slaves are shown for clarity in this embodiments.

Figure 6:
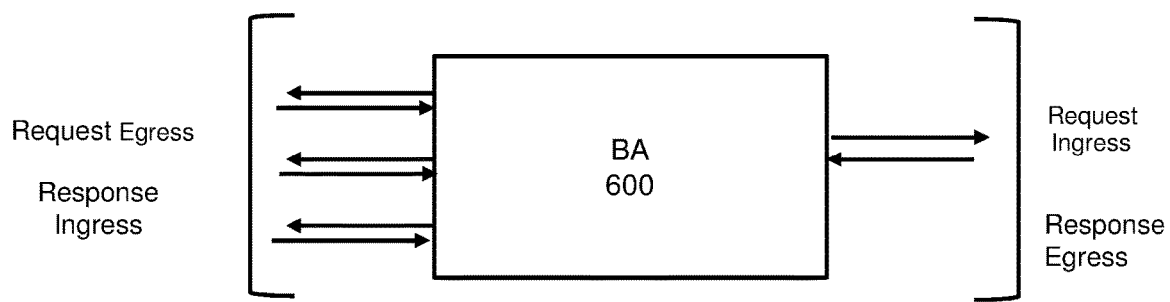
FIG. 6 shows a BA for supporting broadcasting of a transaction according to an embodiment of the invention.

In accordance with this embodiment of the invention, the NoC 100 also includes a broadcast adapter (BA) 142 in communication with the switch 112, a BA 146 in communication with the switch 106, and a BA 148 in communication with the switch 108. The BAs, in accordance with the various aspects and embodiments of the invention, are connected to a request (transaction) network, as shown in FIG. 1 as well as the response (transaction) network side (the connections are shown in FIG. 6 in accordance with one embodiment of the invention).

In accordance with the various aspects and embodiments of the invention, the BA 146 receives a packet (representing a request transaction or a request) on a request ingress port 150 (referred to also as an ingress port 150). The ingress port 150 is on the request side of the transaction. There is a corresponding response ingress port on the response side of the transaction. The BA 146 duplicates the packet and sends the duplicates to each request egress port 152 and 158 (referred to also as an egress port 152 and 158). According to the various aspects of the invention, the destination of each packet from each egress port 152 and 158 is set at the time of design.

Considering the BA 146 as an example. A request packet of data (or request, which may also be referred to as a packet), which represents a transaction, arrives at the ingress port 150 of the BA 146. In accordance with one aspect of the invention, the packet is duplicated and each duplicate packet is sent to each of the egress ports 152 and 158. The egress port 158 sends one of the duplicated packets to the BA 148 through the switch 106 and then the switch 108. The egress port 152 sends another one of the duplicate packets to the BA 142 through the switch 106 then the switch 110 and the switch 112.

In accordance with one embodiment of the invention, a packet arrives at an ingress port 178 of the BA 148. The packet arriving at the ingress port 178 is duplicated. In accordance with an embodiment of the invention, the BA 148 includes an egress port 160 and an egress port 162. The egress port 160 communicates with and sends packets to the slave (or target) 130 through the switch 108 and then using the NI 120. Furthermore, the egress port 162 communicates with and sends packets through the switch 108 and then the NI 122 to the slave (or target) 132.

In accordance with one embodiment of the invention, any packet arriving at an ingress port 172 of the BA 142 is duplicated. In accordance with an embodiment of the invention, the BA 142 also includes two egress ports: an egress port 164 and an egress port 166. The egress port 164 communicates with and sends packets to the slave 134 through the switch 112 and using the NI 124. Additionally, the egress port 166 communicates with and sends packets through the switch 112 and the NI 126 to the slave 136.

Figure 2:
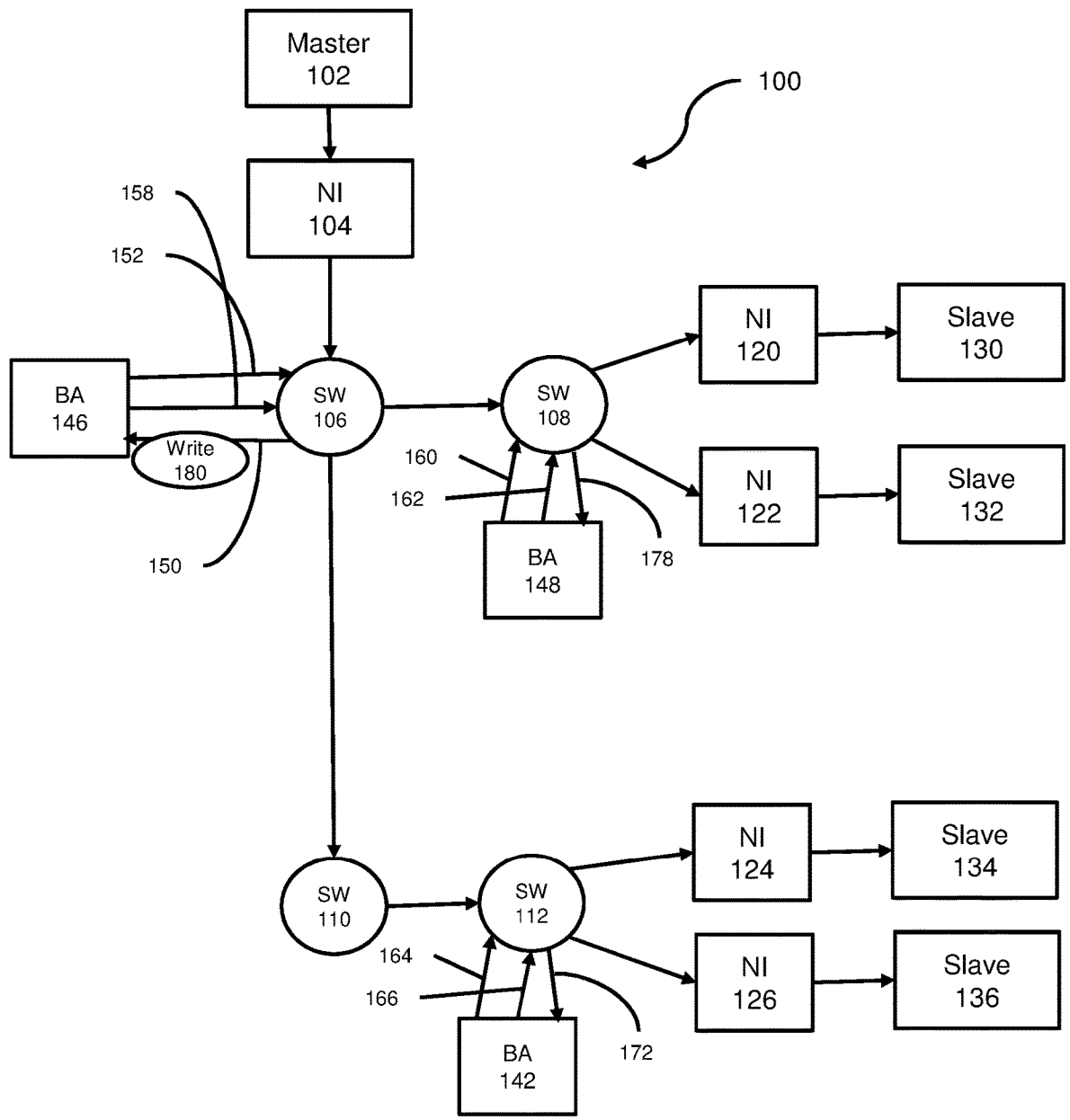
FIG. 2 shows the NoC of FIG. 1 for a master broadcasting a write transaction to multiple slaves when the write transaction is sent to a first broadcast adapter (BA) according to an embodiment of the invention.
Figure 3:
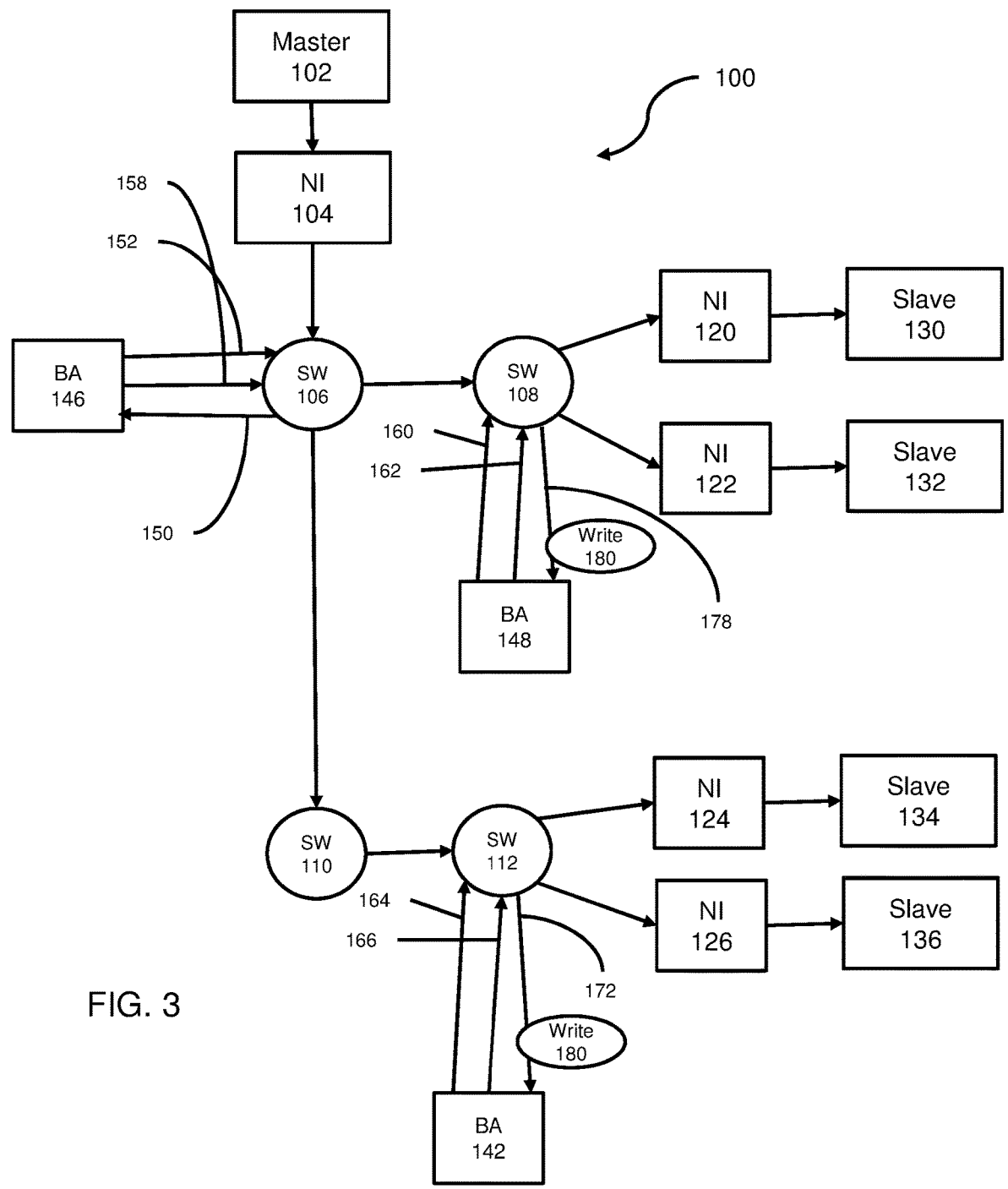
FIG. 3 shows the NoC of FIG. 2 when a write transaction is duplicated by the first BA and sent to other BAs according to an embodiment of the invention.
Figure 4:
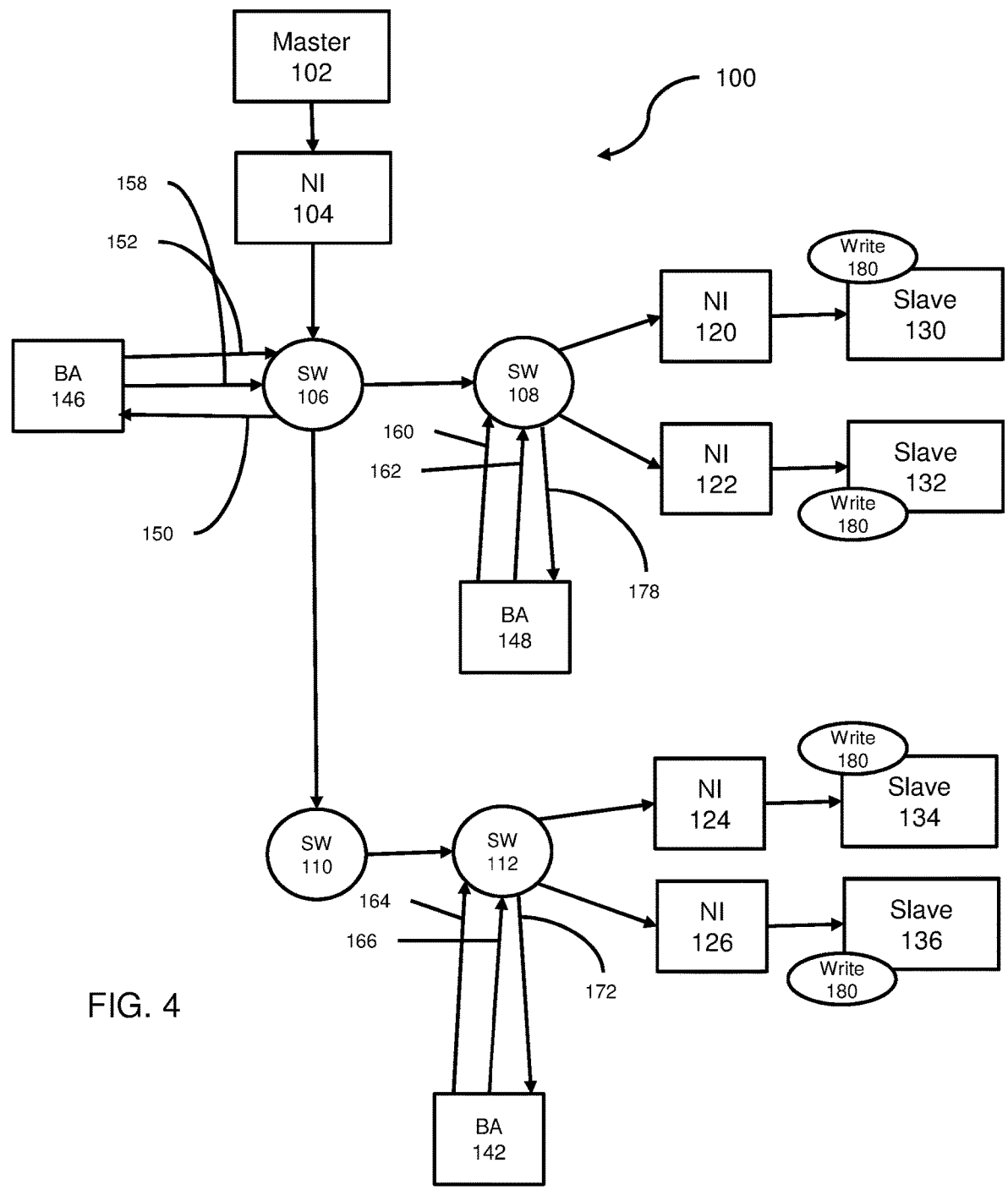
FIG. 4 shows the NoC of FIG. 3 when the other BAs send the write transaction to multiple slaves according to an embodiment of the invention.

Referring now to FIG. 2, FIG. 3, and FIG. 4, in accordance with embodiments of the invention, a write transaction 180 is originating from the master 102. The master 102 is indicating that it is broadcasting the write transaction 180 to the slaves 130, 132, 134, and 136 by sending the write transaction to the BA 146. The master 102 sends the write transaction 180 to an address that is within the BA 146 range of addresses. The write transaction 180 arrives at the ingress port 150 of the BA 146. The BA 146 duplicates the write transaction 180. The BA 146 simultaneously sends the duplicated write transactions 180 through the egress ports 152 and 158. One write transaction 180 arrives at the ingress port 178 (of BA 148) through the switch 106 then the switch 108. Another write transaction 180 arrives at the ingress port 172 (of BA 142) through the switch 106, the switch 110 and the switch 112. The BA 148 and the BA 142, each, duplicate the write transaction 180 arriving at their respective ingress ports. The duplicated write transaction 180 is sent from BA 148, through the egress ports 160 and 162, to the slaves 130 and 132, respectively. The duplicated write transaction 180 is sent from BA 142, through the egress ports 164 and 166, to the slaves 134 and 136, respectively. Thus, the master 102 is able to send a write transaction 180 to the slaves 130, 132, 134, and 136 simultaneously.

Figure 5:
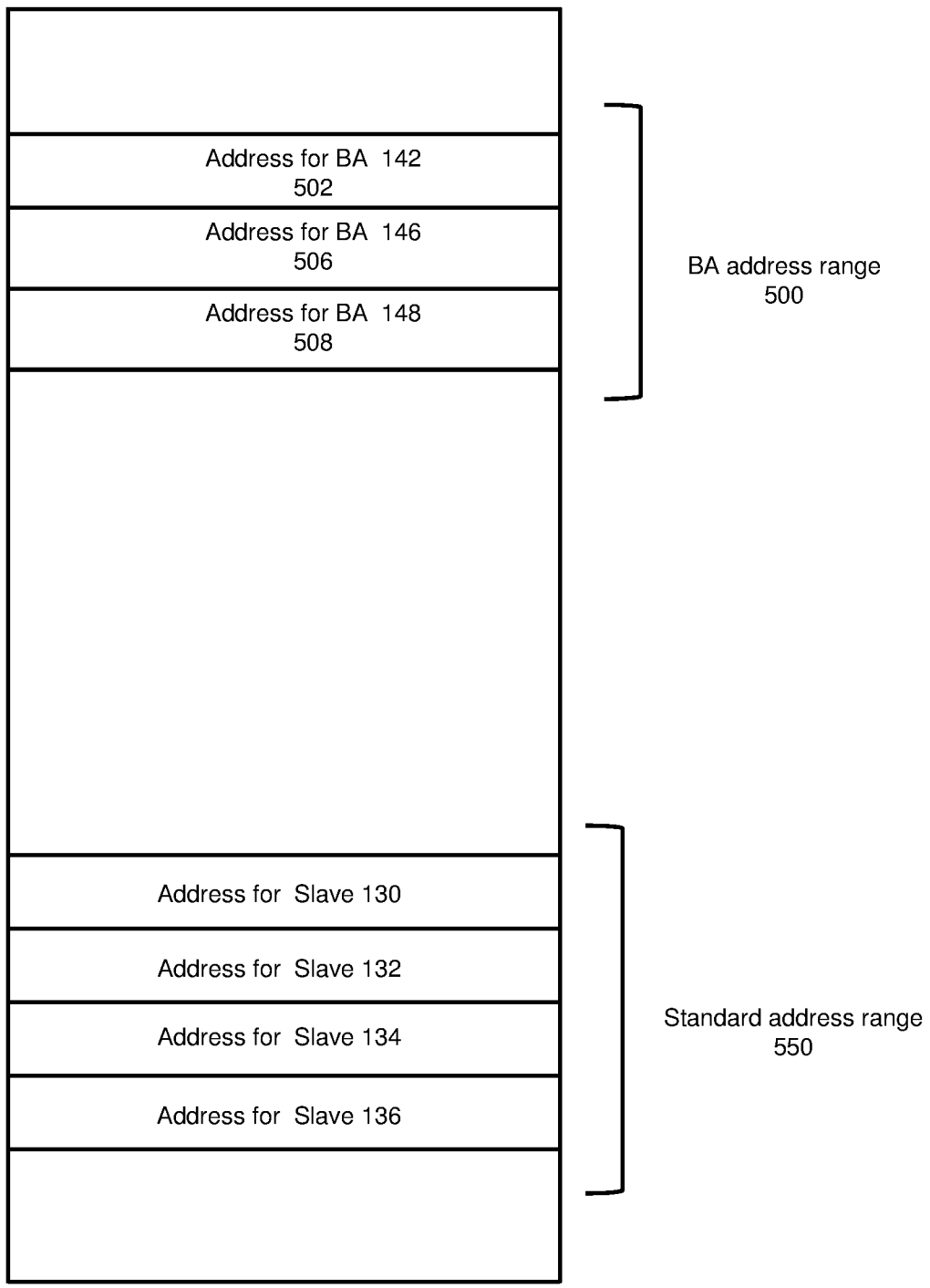
FIG. 5 shows address ranges for broadcasting using the BA according to an embodiment of the invention.

Referring now to FIG. 5, the NoC 100 includes a special range 500 of addresses that identify the BAs and standard address range 550 for each target or slave. As discussed, a BA duplicates a transaction that is received on its ingress port and sends the duplicated transaction to other elements, including other BAs, in the network using its egress port. When a master desires to initiate a broadcast operation and send a transaction to multiple slaves, then the master chooses an address from the address map that corresponds to a BA. The BA is like a target and has an address in the address map of the NoC. Thus, when a master sends a request with an address that matches an address for one of a BA, then the NoC will send the packet to that BA. The BA will then duplicate the transaction or request and send the duplicated transaction, in turn, to other components (switches, pipelines, other BAs, or network interfaces) according to a pre-configured scheme.

Referring now to FIG. 6, a BA 600 is shown with one request ingress ports and three request egress ports, and three response ingress ports and one response egress port, to handle a response coming from all slaves connected to the request egress ports in accordance with various embodiments of the invention. The BA 600, on the response network portion, includes as many ingress ports as egress ports in the request direction: one response ingress port per request egress port. The BA 600 performs response aggregation and combines all the responses that correspond to one duplicate request packet, into a single response packet using a combination function. The combined response is sent back through the BA 600 response egress port.

In accordance with some aspects of the invention, when the transaction is a write request, then one such combination function includes inspecting the write responses from the slaves for errors. If none of the incoming write responses contained an error, then the write responses are aggregated into a write response with no error. If any of the incoming write response contain an error, then the write responses are aggregated into a write response with an error. The aggregate write response is then sent back to where the request came from. The process is repeated until a write response is finally send to the master that made the initial write request.

In accordance with some aspects of the invention, when the transaction from the master is a read request, then the read responses can be combined using a mathematical function such as addition, maximum, minimum and so on. The resulting combined read response is used as the read response to send back to where the request packet was coming from. The process is repeated until a read response is finally send to the master that made the initial read request.

Figure 7:
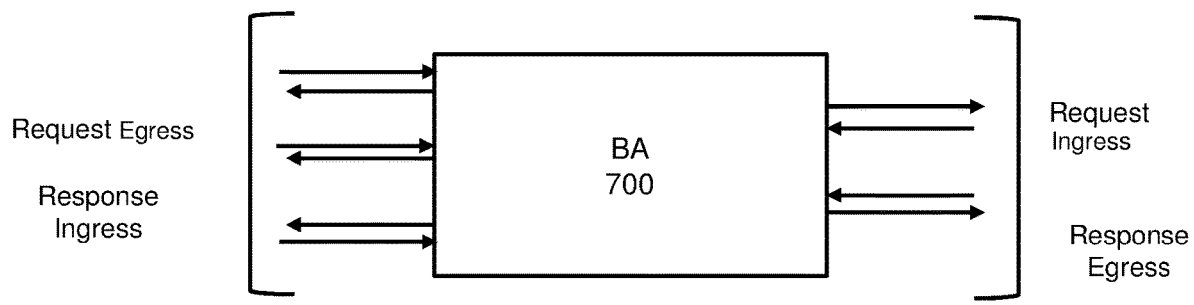
FIG. 7 shows a BA that includes multiple ingress ports for supporting multiple broadcast networks according to an embodiment of the invention.

Referring now to FIG. 7, in accordance with one embodiment of the invention, a BA 700 is shown to support multiple different request type broadcast networks co-existing in a NoC. To support multiple broadcast networks, the BA 700 includes multiple request inputs or ingresses, one per broadcast network, to which the BA 700 is attached. In accordance with this embodiment of the invention, the BA 700 is connected to two broadcast networks. The NoC distinguishes between different broadcast networks by using a bit field in the packet header of a request transaction that is sent to the BA 700. By setting the bit field appropriately, the desired broadcast network is selected from the multiple broadcast networks. The BA 700 sends duplicated packets on the selected broadcast network.

In accordance with one embodiment of the invention, a BA includes the ability to select a particular set of request egress ports of the BA for a given packet that is received on the request ingress port. The packet received on the ingress port of the BA, is duplicated only onto the selected egress port. The selection of specific egress ports is implemented through dedicated selection bits in the header of the request transaction header (the packet header). The dedicated selection bits select the egress ports of the BA that a given packet shall be duplicated into for transmission. The egress ports of the BA, which are not selected, are marked as to be ignored for the response aggregation mechanism when the response transaction is received because no request was duplicated and sent through that specific egress port.

Figure 8:
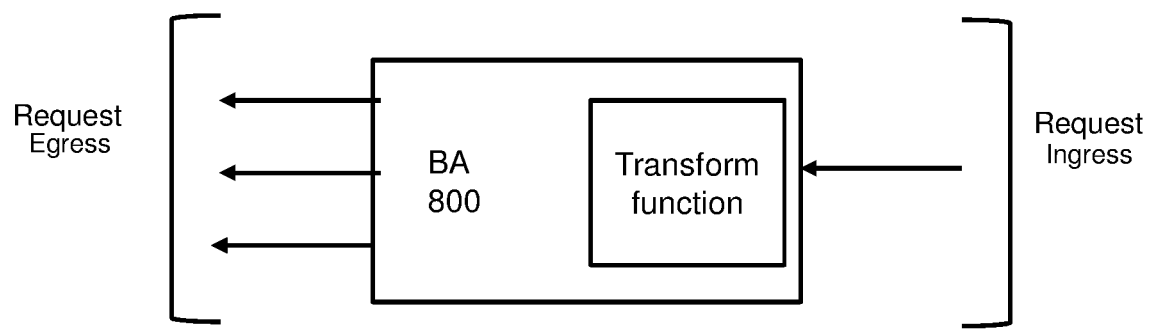
FIG. 8 shows a BA that includes a transformation function module according to an embodiment of the invention.

Referring now to FIG. 8, in accordance with one embodiment of the invention, a BA 800 includes a transformation function for the payload of the transaction or packet. In one embodiment and according to one aspect of the invention, a transformation function includes conversion between different number formats, such as: integer to floating point or between different floating-point representation. Performing the transforming function on a packet payload in the BA 800 provides the advantage of doing the transformation function before the broadcast, wherein the write request is performed multiple times at multiple slaves. As such, the need for doing the transformation of the data at each slave is eliminated because each slave or target (destination) does not need to perform the transformation locally. For example, if an integer to floating point converter is implemented in the first BA (the BA 800), then the master can send a write transaction of an integer to the BA 800. The BA 800 converts the integer into multiple writes requests of the corresponding floating-point representation before forwarding or sending the write request.

Figure 9:
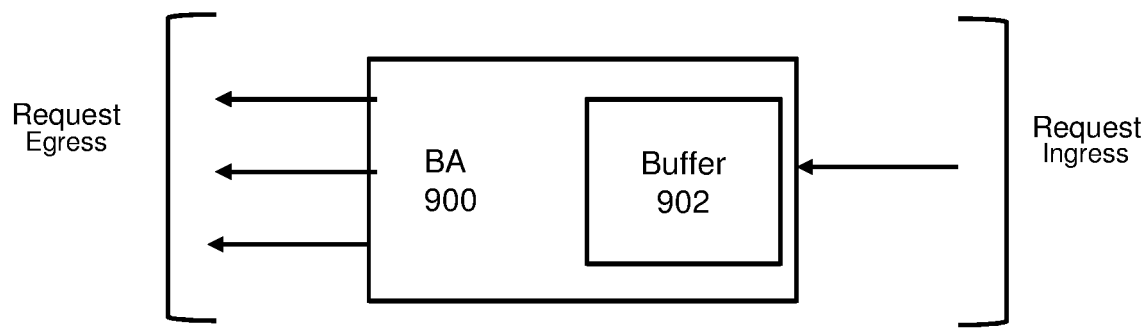
FIG. 9 shows a BA that includes a buffer according to an embodiment of the invention.

Referring now to FIG. 9, in accordance with one embodiment of the invention, a BA 900 includes a buffer 902. The buffer 902 is a first in, first out (FIFO) buffer with one write pointer and one read pointer per egress port of the BA 900. This buffer will permit independent progress of each egress port without having to implement one FIFO per egress port. The capability to make independent progress on each egress port permits freedom in implementation of complex broadcast networks while avoiding deadlocks. The buffer 902 behaves as follows: if one or more egress ports sees backpressure for a given packet FLIT, the FLIT is stored inside the buffer 902 in a FIFO order. Then the read pointer for the backpressured or blocked egress ports are set to that particular location and the write pointer of the buffer 902 advances. Previously blocked egress ports are reading their FLITs from the buffer 902 and each egress port has its independent read pointer inside the buffer 902.

Figure 10:
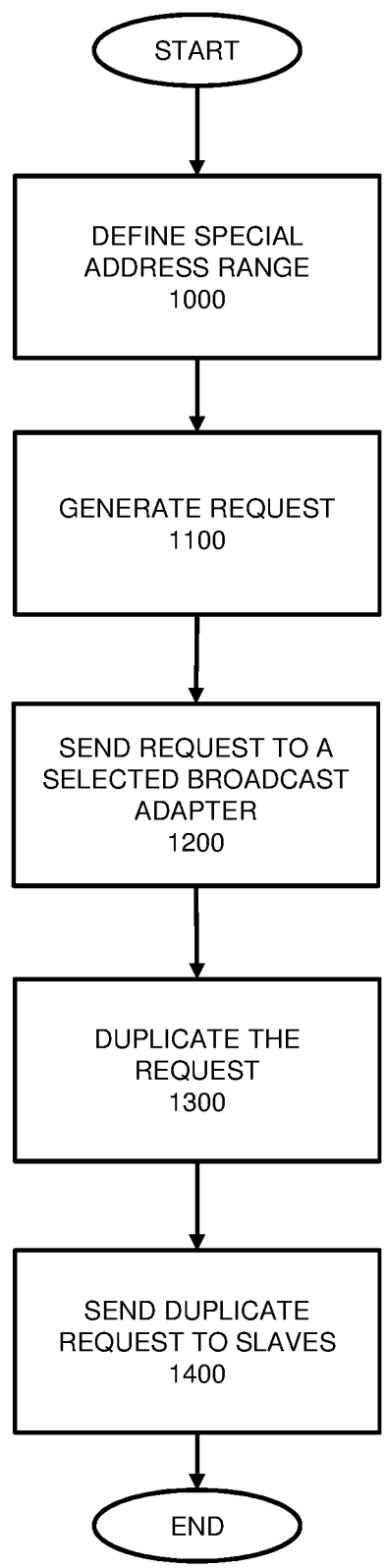
FIG. 10 shows a flow process for broadcast a request from a master to multiple slaves using BAs in a special address ranges according to various aspects and embodiments of the invention.

Referring now to FIG. 10, a process is shown for broadcasting to multiple slaves from one master in accordance with the various aspects and embodiments of the invention. The process begins, at step 1000, by defining an address range, wherein the address range includes addresses for several BAs. At step 1100, a master generates a request to send to a BA. At step 1200, the master selects a BA and uses the address of the BA for the request. The request is received at the ingress port of the selected BA. At step 1300, the BA adapter duplicates the request for transmission through the egress ports of the BA. At step 1400, the BA sends duplicated requests to each slave connected to each of the BA's egress ports. As such, the master is able to broadcast a request simultaneously to several slaves using the address of the BA.

Parallel processing can provide tremendous speedups. This is important for applications such as deep neural networks computations, which can require distribution of the same dataset to multiple nodes simultaneously. In accordance with some aspects of the invention, designers of neural network solutions with can take advantage of the BAs for implementing transaction completion in parallel or simultaneously. For example, various aspects and embodiments of the present invention can be implemented in the field of artificial intelligence computations and deep network accelerators. When implemented in hardware and software, such system can take full advantage of the parallelism of broadcasting using a NoC that includes BAs and run orders of magnitude faster.

Certain methods according to the various aspects of the invention may be performed by instructions that are stored upon a non-transitory computer readable medium. The non-transitory computer readable medium stores code including instructions that, if executed by one or more computers, would cause the computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

The scope of the invention, therefore, is not intended to be limited to the exemplary embodiments shown and described herein. Rather, the scope and spirit of present invention is embodied by the appended claims.

What is claimed is:

1. A network-on-chip (NoC) in communication with a plurality of intellectual property (IP) blocks, which include at least one master and a plurality of slaves, the NoC comprising:
   a plurality of network interfaces (NIs) for receiving a packet from a master, wherein the NIs handle protocol changes to and from a protocol used by the NoC;
   a plurality of switches in communication with the NIs; and
   at least one broadcast adapter, which uses the NoC's protocol, in communication with at least one switch selected from the plurality of switches, the broadcast adapter having an address within a special address range, within which special address range the master addresses the packet, the broadcast adapter including:
      at least one request ingress port for receiving the packet, which includes the address; and
      a plurality of request egress ports for sending duplicated packets to each of the plurality of slaves,
   wherein the broadcast adapter duplicates the packet received at the request ingress port and sends one duplicated packet of the duplicated packets through each request egress port of the plurality of request egress ports.

2. The NoC of claim 1 further comprising a transform module, wherein the transform module performs a function on the packet to generate a plurality of transformed duplicate packets and each of the plurality of transformed duplicate packets are sent through one request egress port of the plurality of request egress ports.

3. The NoC of claim 1 further comprising a buffer in communication with the ingress port and the plurality of egress ports, wherein the buffer stores data when there is backpressure on any given egress port.

4. The NoC of claim 3 further comprising a control module in communication with the plurality of request egress ports, wherein the control module analyzes a control bit of the packet and determines to which of the plurality request egress ports the packet is duplicated.

5. The NoC of claim 1 further comprising a plurality of response ingress ports, such that there is one response ingress port for each of the plurality of request egress ports.

6. The NoC of claim 5, wherein response packets received at the plurality of response ingress ports are combined to form a response packet at a response egress port.

7. The NoC of claim 1 further comprising one response egress port for the request ingress port.

8. A system comprising:
   at least one master that generates request transactions;
   a plurality of slaves that receive and service the request transactions, wherein some of the request transactions are intended for some of the plurality of slaves;
   a network-on-chip (NoC) including:
      a plurality of network interfaces (NIs), wherein at least one NI selected from the plurality of NIs receives request transactions from the at least one master and the NIs handle protocol changes to and from the NoC's protocol;
      a plurality of switches in communication with the plurality of NIs; and
      a plurality of broadcast adapters, each broadcast adapter has an address within a special address range and is in communication with one switch selected from the plurality of switches and each broadcast adapter including:
         at least one request ingress port in communication with the master through a NI selected from the plurality of NIs; and
         a plurality of request egress ports in communication with a group of slaves selected from the plurality of slaves through a group of NIs selected from the plurality of NIs, wherein each of the request transactions are delivered to each of the plurality of slaves; and wherein the at least one master sends a request transaction, which includes an address within the special address range and the address corresponds to a broadcast adapter, wherein the broadcast adapter receives the request transaction and duplicates the request transaction and sends the duplicated request transactions to each slave in the group of slaves using each request egress port of the plurality of request egress ports.

9. The system of claim 8, wherein the request includes a header having control bits that identify a set of request egress ports selected from the plurality of request egress ports for receiving the duplicate request thereby allowing the master to select which of the plurality of request egress ports receive the duplicate request for broadcasting.

10. The system of claim 8, wherein at least one broadcast adapter selected from the plurality of broadcast adapters further includes a buffer comprising:
 one write pointer;
 multiple read pointers; and
 one read pointer for each of the plurality of request egress ports.

11. The system of claim 8, wherein at least one broadcast adapter of the plurality of broadcast adapters comprises:
 a plurality of response ingress ports, such that there is one response ingress port for each of the plurality of request egress ports; and
 one response egress port for the request ingress port.

12. The system of claim 11, wherein response packets received at the plurality of response ingress ports are combined to form a response packet at the response egress port.

13. A method for broadcasting transaction from a master to a plurality of slaves through a network-on-chip (NoC) having a plurality of broadcast adapters, the method comprising:

defining a special address range, wherein each address in the special address range corresponds to one broadcast adapter;

generating, at a master, a request, wherein the request has an address directed to a special address range and the request is delivered to some of the plurality of slaves based on the address;

sending, from the master through at least one network interface (NI) of the NoC, the request to the address in the special address range, wherein the address corresponds to one selected broadcast adapter's ingress port, which is selected from the plurality of broadcast adapters;

duplicating, at the selected broadcast adapter having a plurality of request egress ports, the request to generate a plurality of duplicated requests representing the request, wherein one duplicated request is sent to one egress port of the plurality of egress ports; and sending, to some of the plurality of slaves, the duplicated request thereby allowing the master to generate the request one time and send the request to some of the plurality of slaves using the broadcast adapter of the NoC.

* * * * *